(12) United States Patent
Schumacher et al.

(10) Patent No.: US 7,831,361 B2
(45) Date of Patent: Nov. 9, 2010

(54) CONTROL UNIT FOR PERSONAL PROTECTION

(75) Inventors: Hartmut Schumacher, Freiberg (DE); Gernod Heilmann, Hemmingen (DE)

(73) Assignee: Robert Bosch GmbH, Stuttgart (DE)

( * ) Notice: Subject to any disclaimer, the term of this patent is extended or adjusted under 35 U.S.C. 154(b) by 20 days.

(21) Appl. No.: 11/988,261

(22) PCT Filed: May 22, 2006

(86) PCT No.: PCT/EP2006/062485

§ 371 (c)(1),
(2), (4) Date: Jan. 6, 2009

(87) PCT Pub. No.: WO2007/003469

PCT Pub. Date: Jan. 11, 2007

(65) Prior Publication Data

US 2009/0212544 A1    Aug. 27, 2009

(30) Foreign Application Priority Data

Jul. 4, 2005   (DE) .................. 10 2005 031 085

(51) Int. Cl.
*B60R 22/00* (2006.01)
(52) U.S. Cl. ............. 701/45; 701/46; 701/49; 180/167; 340/428; 340/438; 280/734

(58) Field of Classification Search .......... 701/45, 701/46, 47, 49; 180/167, 170; 340/425.5, 340/428, 438, 439; 280/734, 802
See application file for complete search history.

(56) References Cited

U.S. PATENT DOCUMENTS

| 5,648,739 A * | 7/1997 | Walther et al. ............ 327/330 |
| 2006/0145536 A1 * | 7/2006 | Hackl et al. ................ 307/10.1 |

FOREIGN PATENT DOCUMENTS

| DE | 39 13 628 | 11/1989 |
| DE | 195 42 085 | 7/1996 |
| DE | 195 17 698 | 11/1996 |
| DE | 199 21 146 | 10/2000 |
| EP | 0 615 887 | 9/1994 |
| WO | WO 91/00637 | 1/1991 |

* cited by examiner

Primary Examiner—Gertrude Arthur Jeanglaud
(74) Attorney, Agent, or Firm—Kenyon & Kenyon LLP (57) ABSTRACT

A control unit for personal protection having a polarity reversal protection between an external battery voltage and an internal voltage, to prevent an energy discharge from the control unit. The control unit also has a bidirectional DC/DC converter between an energy reserve and the internal voltage, the DC/DC converter determining its direction of conversion as a function of the internal voltage. The control unit is configured so that the control unit, after a switching-off process, records at least one measured value and generates a signal as a function of this measured value which characterizes an autarchy behavior of the control unit.

16 Claims, 7 Drawing Sheets

CONTROL UNIT FOR PERSONAL PROTECTION

RELATED APPLICATION INFORMATION

The present application is a United States national phase patent application and claims the benefit of and priority to International Application No. PCT/EP2006/062485, which was filed May 22, 2006, and which claims the benefit of and priority to German Patent Application No. 10 2005 031085.0, which was filed in Germany on Jul. 4, 2005, both of which are incorporated by reference.

FIELD OF THE INVENTION

The present invention relates to a control unit for personal protection.

BACKGROUND INFORMATION

A method for ascertaining the autarchy time is discussed in German patent document DE 195 17 698 A1. This provides that after switching off the system critical to safety, the end of the autarchy time is recorded, and after expiration of the autarchy time, a still available triggering readiness time is ascertained during which the system could still be kept in triggering readiness by an auxiliary power source, and, in response to switching on the system critical to safety, the autarchy time valid for the current operating time is ascertained from the autarchy time valid during the last operating time and the triggering readiness that was ascertained after the last switching off and is still available. The capacitance of the energy reserve is determined in this instance. But the ascertained current usage or the ascertained supply voltage may also be used in this case.

SUMMARY OF THE INVENTION

By contrast, the control for personal protection according to the exemplary embodiments and/or exemplary methods of the present invention, having the features of the independent claim has the advantage that the control unit monitors at least one measured value upon a switching-off operation and generates a signal as a function of it, in light of this signal an assessment being made by the control unit as to how it will behave in an autarchy case. Thereby, errors can be detected early and altogether a secure functioning of the control unit may be assured in an autarchy case. As the signal, one might consider activating signals or counting units or stored items or comparison results or the measured value itself, for example.

The control unit according to the exemplary embodiments and/or exemplary methods of the present invention ensures the monitoring of the integrity of the supply system, inclusive of the connected external sensors, so that the system made up of the control unit, the connected sensors and the personal protection means will remain fully capable of functioning, even in a real autarchy case, through a desired time, without interference as, for instance, a system reset.

In order to achieve this, important system features may be required. One feature is polarity reversal protection between the external battery voltage UB and an internal voltage VZP, which is generated by battery voltage UB in the normal case, but may also be made available in the autarchy case from the energy reserve, such as by a DC/DC step-down transformer.

In the autarchy case, this control unit protects from the draining away of energy into the vehicle electrical system, particularly if the latter has a short circuit to ground. The testing for integrity of the system supply in the autarchy case should therefore be initiated preferably at each switching off of the control unit by a first measurement of battery voltage UB and internal voltage VZP, as soon as battery voltage UB falls below a minimum threshold UBoff (e.g. 5 V). The condition for carrying out the measurement is a charged energy reserve of a system ready for operation. This measurement confirms the blocking capability of the polarity reversal protection diode, since the internal voltage VZP has to be greater than battery voltage UB.

A second feature is a bidirectional DC/DC converter which, independently of a microcontroller μC, supplies energy from the energy reserve to supply voltage VZP, in the case of too low an internal voltage VZP, when threshold VZP_min is undershot. This independence makes it possible to distinguish between a dynamically occurring reset in the system and an autarchy state caused, for instance, by normal switching off. In the following text, depending on the operating mode, the DC/DC converter is also called DC/DC step-down transformer if the converter converts from the energy reserve voltage to the internal voltage; in normal operation, the DC/DC converter transforming the battery voltage and the internal voltage upwards so as to charge the energy reserve.

When a system has attained its operating readiness, and when it signals this by deleting the warning information, for instance, by extinguishing the warning lamp, this is characterized by a charged energy reserve. This analog quantity is supplied via a voltage divider to microcontroller μC for monitoring. The latter first of all converts this quantity to a digital quantity, using an analog-digital converter. After a regular system start, monitoring of the energy reserve voltage begins for keeping to a band, after a time which is either known as a fixed parameter of the software of microcontroller μC, or is established additionally as a function of the battery voltage. Furthermore, a first measurement of the energy reserve voltage is carried out at the start of the system, directly after a RESET release and the initialization of microcontroller μC.

After a regular utilization of the energy reserve, if a system has run into RESET, the voltage at the energy reserve must have fallen below a minimum value VERoff which is no longer sufficient correctly to generate the required system voltages. By contrast, if a system in the ready operational state and at full energy reserve is stopped at RESET by an interference, and has been started anew, microcontroller μC detects, by a first measurement of energy reserve voltage VER, that the latter already has a value that is very much smaller than VERoff, and therefore the reasons for the new start ("warm start") were not an autarchy case or a regular switching off, but a non-admissible RESET caused, for example, by an interference.

Another feature which decides on the autarchy quality is the knowledge that, in case this occurs, the completely usable energy is available. This is not only a question of capacitance and current usage, but also a global property of the system which expresses itself in that the energy reserve voltage VER is able to be used from a value VERreg_max to a value VERoff.

When the operating readiness of the system is achieved, that is, all initialization tests have been terminated, and the energy reserve voltage is in the valid monitoring band (21-28) V or (31-38) V, an autarchy test marker is written into a memory, such as an EEPROM ("TO BE CHECKED FOR AUTARCHY"), in order to prepare for the validity of autarchy tests.

The control unit components that belong to this feature are the recording of the already known energy reserve voltage VER and battery voltage UB, as well as additionally the recording of internal voltage VZP by microcontroller μC via the voltage divider.

The rate of repetition of the measurement is between 1-10 ms, usually 1 ms. In addition, preferably a capacitor $C_{VZP}$ may be used for the VZP voltage regulation in the case of autarchy. If the autarchy case occurs characterized by UB<UBoff, the DC/DC converter is activated independently of the microcontroller when VZP<VZPth, and a voltage VZP=VZPreg, such as 6.3 V is generated at $C_{VZP}$, which takes over further system supply from energy reserve ER.

Along with increasing discharge of the energy reserve, the maintenance of control voltage VZPreg approaches its end.

By the cyclical measurement of voltage VZP in the same signaling pattern as energy supply voltage VER, such as 1-10 ms, the end is detected of the stable regulation of internal voltage VZP by the reaching of VZP=VZPreg_min (e.g. 6.0 V) at VZPregoff=5.8 V. Voltage VER=VERoff, also measured in this signaling pattern at time VZPregoff, is now written into the EEPROM as the last still safely storable measured value. The writing process for EEPROM's lasts approximately 1-10 ms. When there is a new start in the system, also directly after the RESET release and the initialization of microcontroller μC, a comparison is made of voltage VERoff to energy reserve voltage VERoff_setpoint, which is known to the system as a parameter, and which is specified and assumed as a condition for the energy reserve calculation.

If VERoff<VERoff_setpoint, then the requisite system properties in response to the last autarchy request, as a rule the normal switching off of the control unit, are completely satisfied.

If this is not the case, a VERoff_FZ (error counter for defective VZP autarchy regulation) is incremented by one, for example. When the counter reading reaches the value n, for instance 3, the system's warning lamp is lit preferably steadily. In one further embodiment, the VERoff_FZ error counter may be incremented by 1 in response to each detected error, and decremented by 1 in the case of an error that was not detected. Moreover, the incrementing and decrementing scaling could also be selected to be respectively different.

When the operating readiness of the system is attained, that is, all initialization tests have been terminated and the energy reserve voltage is in the valid monitoring band (21-28) V or (31-38) V, the value VERoff, that is present in the EEPROM for valid monitoring from the last autarchy request, is preferably overwritten by an identifier ("NOT A MEASURED VALUE"), in order to prepare the test VERoff<VERoff_setpoint for the coming autarchy case.

This feature is also a complex one which goes far beyond the simple knowledge of individual quantities, such as, for example, the energy reserve capacity.

This test may, for example, be passed successfully if
a) the DC/DC converter fulfills its function,
b) the control capacity CVZp is present, having good qualitative properties (sufficient capacity, small inner resistance ESR), whereby a good regulation is possible at all of internal voltage VZP in the case of autarchy.
c) The stability of control voltage VZP is maintained over the valid VER range, as well as the further voltage controllers, such as VZP→VSTI controller, which are supplied therefrom.
e) The current usage at internal voltage VZP is within the expected scope.

Besides the capacitance measurement and the ESR measurement of the energy reserve, in the integrity testing of the system described here (control unit having connected components), the specified autarchy time in the case of autarchy is checked in addition. When the operating readiness of the system is achieved, that is, all initialization tests have been terminated, and the energy reserve voltage is in the valid monitoring band (21-28) V or (31-38) V, an autarchy test marker is written into the EEPROM, ("AUTARCHY ABLE TO BE CHECKED"), in order to prepare for the validity of autarchy tests.

An autarchy time counter is started using the following normal switching off of the system or a genuine autarchy case, characterized by UB<UBoff. When the counter attains the value AUTARCHY TIME_min that is specified and known to the system as a parameter, energy reserve voltage VER=VERignition is measured. This value has to be greater than a boundary VERfiring_min, which is selected so that firing of the means of restraint is also possible under the required current conditions.

When voltage VER attains the value VERfiring_min, the expired autarchy time=AUTARCHYtimecounter is stored in an EEPROM. When there is a new start of the system, directly after the RESET release and initialization of the autarchy, test markers are read out from the EEPROM and evaluated. If it is set at "AUTARCHY ABLE TO BE CHECKED", the stored autarchy time is evaluated.

If AUTARCHYtime<AUTARCHYtime_min, an AUTARCHYtime_error counter is incremented by 1 in a nonvolatile memory (EEPROM). When the counter reading reaches the value n, for instance equal to 3, the system's warning lamp is lit steadily. The signal within the meaning of the embodiment is accordingly the activation of the system's warning lamp, in this case.

In one further embodiment, the AUTARCHY TIME_error counter may be incremented by 1 in response to each detected error, and decremented by 1 in the case of each error that was not detected. Moreover, the incrementing and decrementing scaling could also be selected to be the same or different. In this case, the error counter is the signal within the meaning of the embodiment.

A more extending feature of checking the autarchy for integrity is the checking of the communication capability to the external sensors. Using the following normal switching off of the system or a genuine autarchy case, characterized by UB<UBoff, the communication up to reaching the boundary VER<VERfiring_min is continued cyclically in real time and is checked.

If a communications error appears, it is stored in a non-volatile memory (EEPROM). A communications error counter (KOMM_FZ) may be used for filtering, which is incremented by one in response to each occurrence of a communications error. When there is a new start of the system, directly after the RESET release and initialization of the autarchy, test markers are read out from the EEPROM and evaluated. If it is set at "AUTARCHY ABLE TO BE CHECKED", the stored KOMM_FZ is evaluated.

When the counter reading reaches the value m, for instance equal to 3, the system's warning lamp is lit steadily, and if not, decrementing may also take place.

In a further embodiment, for each connected external sensor its own communications_error counter may be introduced. For the distinction as to whether communications errors are occurring in the normal state of the system or during autarchy, different communications error counters may be saved. This particularly makes possible that errors or the functioning of sensors connected to the control unit, that is, so-called satellites or assistants are detected. Because these sensors, too, are supposed to be supplied with energy from the energy reserve in response to a fault in the battery voltage, without their becoming unusable in this critical phase on account of communications errors.

The control unit according to the exemplary embodiments and/or exemplary methods of the present invention is therefore more secure, since in the case of chopping of, or sudden drop in the battery voltage, it is still fully capable of functioning for a certain time. Furthermore, the control unit is thereby more intelligent, since it is in a position of distinguishing various errors, such as the sudden drop of the battery voltage or a reset. In addition, the real case without battery supply is simulated during the monitoring of the energy reserve, in the control unit according to the exemplary embodiments and/or exemplary methods of the present invention.

Moreover, it is of advantage that the control unit detects an error in the control unit exactly when the internal voltage indicates too low a value and the battery voltage is normal. In this case, an error signal is generated by the control unit, and as a function of that, for instance, an optical or acoustical warning is able to be output that the control unit has a defect, for example.

It is also advantageous that, besides the measurement of a capacitance and/or ESR of the energy reserve, the control unit assesses these in addition, in light of energy output to an internal voltage (VZP). Parameters which simulate the ideal case for the autarchy are measured thereby, and thus better information is able to be rendered concerning the autarchy capability of the control unit.

It is advantageous that the control unit monitors additional parameters after the expiration of the autarchy time, right up to the limit of storability of the results, in order to determine whether the control unit will also continue to show no autarchy weaknesses which have to be discovered to create a remedy, for instance by changing defective components.

In addition it is advantageous that the control unit, when reaching a specified state, for instance, a transient state after switching on, sets a MARKER in a nonvolatile memory, and thereby establishes the standard conditions for the parameters to be observed of a regular autarchy case or at least a normal switching off.

Finally, it is also of advantage that the control unit writes data into a memory as a function of the energy reserve data. For a subsequent analysis, this makes available data on the voltage, the capacitance and the inner resistance of the energy reserve as well as of the energy reserve voltage after the end of the specified autarchy time and of the smallest usable energy reserve voltage. This facilitates the verification of the functioning capability of the control unit.

Exemplary embodiments of the present invention are illustrated in the drawings and explained in greater detail in the following description.

DETAILED DESCRIPTION

Up to now, systems relevant to safety, particularly control units for personal protection, monitor the capacitance of the energy reserve, particularly an electrolytic capacitor, this capacitor being used for providing energy for supplying the control unit in the autarchy case, and/or for the firing of means of restraint.

Using the monitoring of the energy reserve, it is by no means sure that the control unit certainly remains capable of functioning fully for a certain time after interruption of the power supply. This particularly applies to the sole measurement of the capacitance of the capacitor. Even the known down-converter test, in which, for the test, current is removed from the energy reserve for a self-generated supply of the control unit, does prove the capability of removing energy from the energy reserve for a test command, and of supplying it to the polarity reversal-protected air bag voltage, but this does not represent the real case.

What is real is the condition in which the supply of the control unit and the satellites fed by it does not only take place by the battery voltage source via a polarity reversal diode, but from the personal protection system itself, namely by the autarchy energy.

This condition is characterized by chopping or power supplies that are too low, for instance, because of a crash, and therefore has to be detected by the control unit in a stand-alone manner. Even in the case of classical switching off of the system by the ignition key, this detection method will run through to autarchy. The observation and evaluation of this process, which is able to be equivalent to a genuine battery chopping as occurs in the case of a crash, also ensures the availability of the personal protection.

Every real switching-off procedure of the control unit for the personal protection by the interruption or the sudden drop of the battery voltage is used to observe and evaluate the real way of acting of the supply system by the central microcontroller in the control unit. The control unit according to the exemplary embodiments and/or exemplary methods of the present invention has a large number of advantages:

The monitoring of the polarity reversal protected voltage has to activate a DC/DC converter at the proper time at a specified, lowest possible boundary, which steps down the voltage of the energy reserve to a required value. It has to be avoided, in this instance, in spite of a full energy reserve and a successful step-down transformer test, that is, conversion of the voltage of the energy reserve capacitor to the voltage that is required in the control unit, that the control unit comes to a standstill by reset in the digital supply or by communications breakoff of the satellites.

This then ensures that the autarchy detection is carried out with the aid of internal voltage VZP. It is also ensured that the DC/DC converter has been activated in time, and the current required by the control unit is able to be provided. It is of advantage, in this case, that in this procedural manner the regulation of voltage VZP is made possible by step-down transformer VER→VZP, by microcontroller μC via the autonomous recording of internal voltage VZP and, in supplementation, by the band monitoring of the output voltages, which are derived from VZP, such as the 5V analog/digital voltage.

By checking the communication to the satellite sensors all the way over the entire assured autarchy time, the system is able to ensure the evaluation of the satellite sensors in a detectable manner, even in the case of a crash leading to interruption in the supply. By checking the voltage of the energy reserve, after the expiration of the assured autarchy time, without the firing of the means of retention, it is ensured that the efficiency of the voltage supply as well as the currency requirement are within the admissible tolerances. In this way, an inadmissibly high current in the control unit or the satellites, as may be present in response to defects, is also detected. The control unit according to the exemplary embodiments and/or exemplary methods of the present invention makes it possible to detect any kind of reset processes, whose cause is not a sudden drop or an interruption of the supply voltage, as can occur by electrical interference, electromagnetic irradiation, moisture, etc. This is possible because a so-called warm reset takes place, without diminishment of the energy store of the autarchy device.

The following abbreviations are used:

FZ=error counter

UB_off=voltage threshold of the battery voltage at which certainly supply is no longer possible.

VERreg_min=minimum control voltage of the charged energy reserve.

VERreg_max=maximum control voltage of the charged energy reserve.

VER_firing_min=minimum energy reserve voltage after expiration of the setpoint autarchy time VERoff_max maximum value of the energy reserve voltage which leads to the breakdown of the control voltage when it is undershot.

VZPreg_min=minimum control voltage of VZP in the autarchy case.

VZPreg_max=Maximum control voltage of VZP in the autarchy case.

VZPreg_off=minimum voltage at VZP after leaving the control band that still permits a safe error treatment below that RESET of control units takes place VER_off=current energy reserve voltage when VZP=VZPreg_off AUTARCHYtime_min=minimum time of self-generated supply of the control unit, VER being >VER_firing_min KOMM_FZ=communications error counter to external sensors, etc.

MW=measured value

Figure 1:
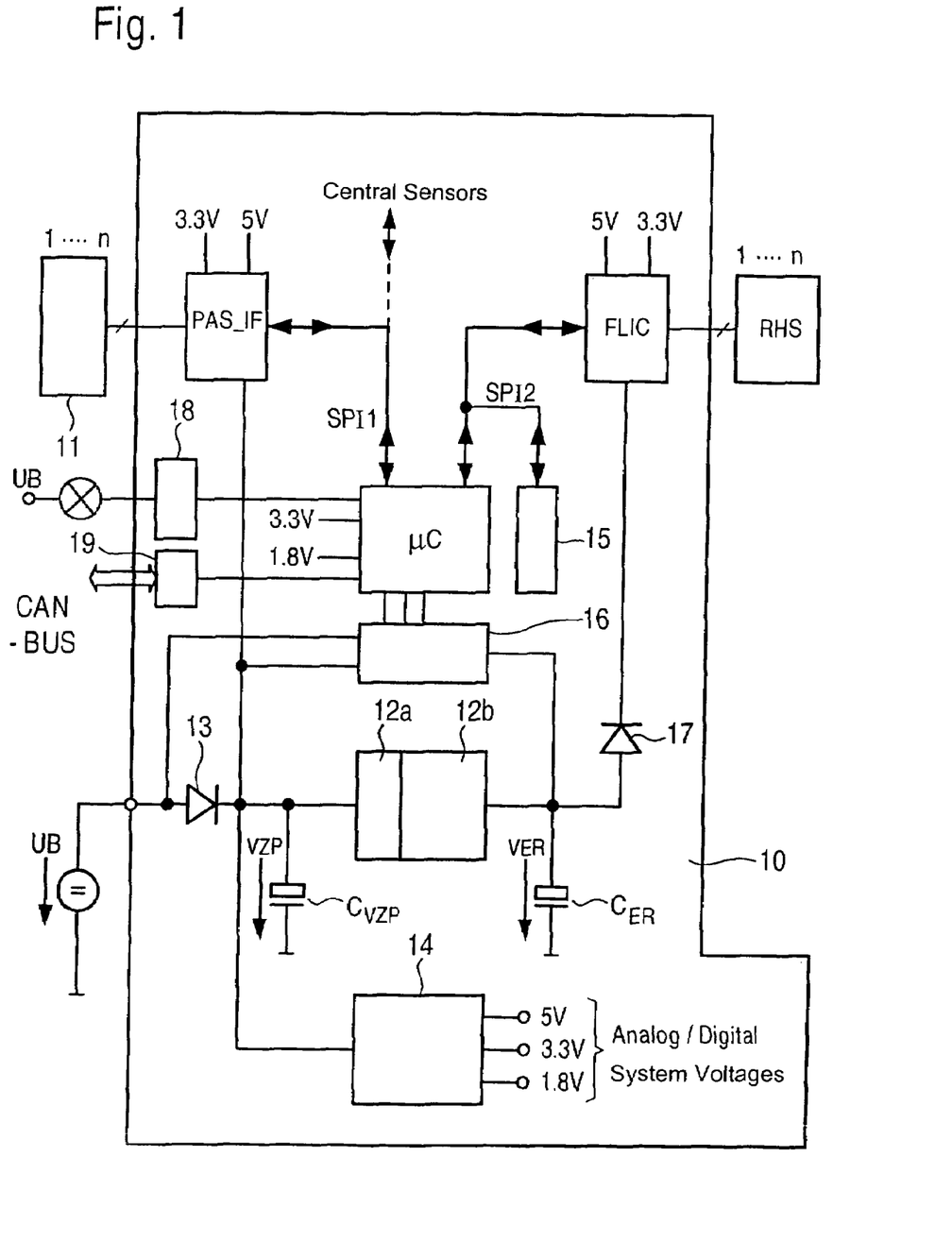
FIG. 1 shows a block diagram of the control unit.

FIG. 1 shows a first block diagram of the control unit according to the exemplary embodiments and/or exemplary methods of the present invention. In its housing, control unit 10 has a microprocessor or a microcontroller µC which is connected to an interface component PAS_IF via a data interface, such as an SPI line SPI1. Interface component PAS_IF is used as connection for external sensors 11. Such external sensors 11 are remote acceleration sensors, for example, for instance in the area of the hood, or they may be side impact sensors, which may be acceleration sensors and/or pressure sensors, or even weight sensors and passenger position detection sensors. Microprocessor µC is connected to a firing output stage FLIC via a second data interface, for instance, an SPI line SPI2. Firing output stage FLIC is used to fire firing circuits for means of retention RHS. Means of retention RHS are located outside control unit 10. These are air bags, seat belt tensioners and/or rollover bars. DC/DC converter 12 is made up of an independent comparison device 12a, which compares inner voltage VZP to threshold VZPth (e.g. 5.2 V), and in the case of falling below it, switches DC/DC converter 12b VZP←—→VER in step-down mode (autarchy). DC/DC converter 12 is intended to utilize the energy of an energy reserve capacitor $C_{ER}$ for the energy supply of control unit 10, instead of the missing or inadequate voltage UB, and to make it available to CVZp as controlled voltage VZP=VZPreg (e.g. 6.3 V). The supply of control unit 10 comes from VZP. It can be utilized directly, as in the case of PAS_IF or via additional voltage transformers 14, which generate digital and analog supply 5 V, 3.3 V, 1.8 V of all the components.

Microprocessor µC monitors voltages UB, VZP and VER via a multi-channel analog/digital converter for the task discussed here, and it does this via a level equalization circuit 16 (in the simplest case, independent voltage dividers, but in special cases also voltage dividers having level limitation and noise filtering).

Battery voltage UB is normally used to supply control unit 10. Via polarity reversal protection diode 13 having its anode at UB, internal voltage VZP is able to be formed protected from polarity reversal from the battery voltage, or, in the autarchy case, protected from a short circuit in the battery supply to ground, it is able to be controlled by chopper-type regulator 12 from $C_{ER}$ to $C_{VZP}$.

Energy reserve $C_{ER}$ is also used in the normal case for providing the firing current for FLIC. For this purpose, the anode of a polarity reversal protection diode 17 is connected to $C_{ER}$ which, in turn, is connected to DC/DC converter output 12. The cathode of diode 17 is connected to the FLIC. Many details necessary for the actual functioning of control unit 10 are not shown here, for simplicity's sake, since the subject matter is concerned only with energy supply, in this instance.

Because of the monitoring of internal voltage VZP and battery voltage UB, in normal operation, microprocessor µC is able to detect the presence of the polarity reversal protection diode in the forward direction.

If voltage UB, that is monitored by microprocessor µC, falls below a lower boundary value UBoff (e.g. 5 V) over several successive measurements at a scanning rate of 1-10 ms, the autarchy case has to come about, because internal voltage VZP thereby also falls below threshold VZPth (e.g. 5.2 V) of comparison device 12a.

Now, microprocessor µC has detected that there is an autarchy case present from a UB supply point of view, and that the system will only remain capable of functioning if the hardware also detects this, given by comparison device 12a, switches DC/DC converter VZP←—→VER to step-down mode in good time and is able to remove energy from energy reserve $C_{ER}$ in order to form a sufficiently high control voltage for VZP.

The following tests of integrity of the autarchy state will now be carried out:

However, the evaluation takes place only if the system was previously able to achieve its normal operating state, characterized, from an energy point of view, in that energy reserve voltage VER was in a well-defined monitoring band, for instance, 21-28 V or 31-38 V, etc. This circumstance is characterized by an autarchy test marker. For this purpose, "AUTARCHY ABLE TO BE CHECKED" is written into the cell autarchy test marker of nonvolatile memory 15.

a)

Microprocessor µC starts an autarchy time counter based on the condition UB<UBoff. This condition has to be valid during the entire testing.

The measurement of voltage UB takes place at a repetition rate such as 1-10 ms.

When the autarchy time counter attains the value AUTARCHYTIME_min that is assured and known to the system as a parameter, energy reserve voltage VER=VERfiring is measured. This value has to be greater than a boundary value VERfiring_min (e.g. 15 V), which is selected so that firing of the means of restraint is also possible under the required conditions.

For later evaluation, the value of VERfiring is written into a nonvolatile memory 15 (EEPROM), which is connected to the μC via a data interface, such as a serial SPI line (SPI2). In a broadening of the method, the counter reading of the AUTARCHYtimecounter may also be written into a nonvolatile memory 15 when voltage VER=VERfiring_min is attained.

When there is a new start of the system, directly after the RESET release and initialization of the autarchy time, test markers are read out from the EEPROM via microprocessor μC and evaluated. If it is set at "AUTARCHY ABLE TO BE CHECKED", the stored autarchy time is evaluated. If the AUTARCHYtime<AUTARCHYtime_min, an AUTARCHYtime_error counter (AUTARCHYtime_FZ) is incremented by 1 in nonvolatile memory 15 (EEPROM).

When the counter reading reaches the value n (e.g. =3), the system's warning lamp is lit steadily, or an error information is output as the signal to a standardized vehicle bus, such as a CAN, via a transceiver 19.

In one further embodiment, the AUTARCHY TIME_error counter may be incremented by 1 in response to each detected error, and decremented by 1 in the case of each error that was not detected. Moreover, the incrementing and decrementing scaling could also be selected to be the same or different. Energy reserve voltage VERfiring is also evaluated. If VERfiring<VERfiring_min, an error counter is incremented concerning insufficient voltage (VERfiring_FZ). When the counter reading reaches the value m (e.g. =3), the system's warning lamp is lit steadily, or an error information is output as the signal to a standardized vehicle bus, such as a CAN, via a transceiver 19.

In one further embodiment, VERfiring_FZ may be incremented by 1 in response to each detected error, and decremented by 1 in the case of each error that was not detected. Moreover, the incrementing and decrementing scaling could also be selected to be the same or different.

If the system has reached its normal operating state, characterized, from an energy point of view, by energy reserve voltage VER in a well-defined monitoring band, such as 21-28 V or 31-38 V, etc., "NO MEASURED VALUE" is written into nonvolatile memory 15 for AUTARCHYtime and VER_firing. With that, the system is ready to carry out the testing described above for the next autarchy to be observed.

In one additional embodiment, the condition UB<UBoff, if it was not maintained during the entire autarchy time measurement, may be used to break off the measurement, since the prerequisite for autarchy was not continually a given. A measuring break-off is characterized by describing the autarchy time test marker in memory 15 as "autarchy time not able to be checked".

b)

Triggered by the autarchy state UB<UBoff, the communication to external sensors (acceleration, pressure, etc.) 11 via the 1-n interface is continued cyclically up to the attainment of the boundary VER<VERfiring_min in real time, and is checked.

If a communications error appears, it is written into a nonvolatile memory 15 (EEPROM). A communications error counter (KOMM_FZ) may be formed for filtering in nonvolatile memory 15, which is incremented by 1 in response to each occurrence of a communications error.

In a further embodiment, for each connected external sensor its own communications_error counter may be introduced.

For the distinction as to whether communications errors are occurring in the normal state of the system or during autarchy, different communications error counters may be saved (stored). This particularly makes possible that errors or the functioning of sensors connected to the control unit, that is, so-called satellites or assistants are detected. For, these sensors, too, are supposed to be supplied with energy from the energy reserve in response to a fault in the battery voltage, without their becoming unusable in this critical phase on account of communications errors. When there is a new start of the system, directly after the RESET release and initialization of the autarchy time, test markers are read out from the EEPROM via microprocessor μC and evaluated. If it is set at "AUTARCHY ABLE TO BE CHECKED", the stored communications error is evaluated (in autarchy). If KOMM_FZ> e.g. 3, the system's warning lamp is steadily lit, or an error information is output to a standardized vehicle bus, such as a CAN, via a transceiver 19.

In one additional embodiment, the communications_error counter may be decremented again without warning, after an evaluation.

c)

Triggered by autarchy state UB<UBmin, DC/DC converter 12 is activated independently of microprocessor μC when VZP becomes <VZPth, and a voltage VZP=VZPreg, such as 6.3 V is generated at $C_{VZP}$ which takes over the further system supply from ER. Along with increasing discharge of the energy reserve, the maintenance of control voltage VZPreg approaches its end.

By the cyclical measuring of voltage VZP in the same signaling pattern as VER, for instance, 1-10 ms, via level equalization circuit 16, the end of the stable regulation of VZP by the attainment of VZP=VZPreg_off, e.g. 5.8 V, is detected by microprocessor μC. Voltage VER=VERoff that is also measured in this signaling pattern at time VZPreg_off is now written into the EEPROM as the last still safely storable measured value into nonvolatile memory 15 (EEPROM). The writing process for EEPROM's lasts approximately 1-10 ms.

When there is a new start of the system, directly after the RESET release and initialization of the autarchy time, test markers are read out from nonvolatile memory 15 (EEPROM) by microprocessor μC and evaluated. If it is set at "AUTARCHY NOT ABLE TO BE CHECKED", no testing of memory cell VERoff and no error treatment take place.

Microprocessor μC then continues its further program sequence in order to attain operating readiness. If it is set at "AUTARCHY ABLE TO BE CHECKED", the content of memory cell VERoff is read out of 15 and compared to the lower usable energy reserve voltage VERoff_setpoint that is specified and assumed as a prerequisite, and which is known to the system as a parameter.

If VERoff<VERoff_setpoint, then the requisite system properties in response to the last autarchy request, as a rule the normal switching off of the control unit, are completely satisfied.

If this is not the case, an error counter which marks the erroneous VZP regulation (VERoff_FZ) is incremented by 1. If the counter reading reaches the value p (e.g. 3) the system's warning lamp is steadily lit or a CAN message having this error information is output. In one further embodiment, VERoff_FZ may be incremented by 1 in response to each detected error, and decremented by 1 in the case of each error that was not detected. Moreover, the incrementing and decrementing scaling could also be selected to be respectively different.

If the system has reached its normal operating state, characterized, from an energy point of view, by energy reserve voltage VER in a well-defined monitoring band, such as 21-28 V or 31-38 V, etc., "NO MEASURED VALUE" is written into nonvolatile memory 15 for the value of VERoff. With that, the system is ready to carry out the testing described above for the next autarchy to be observed.

This feature is also a complex one which goes far beyond the simple knowledge of individual quantities, such as, perhaps the energy reserve capacity.

This test may, for example, be passed successfully if
1) the DC/DC converter fulfills its function
2) the regulating capacitance $C_{VZP}$ is present, having good qualitative properties (sufficient capacitance, small inner resistance ESR), whereby a good regulation is possible at all of internal voltage VZP in the case of autarchy.
3) The stability of control voltage VZP is maintained over the valid VER range, as well as the further voltage controllers, such as VZP→VSTI controller, which are supplied therefrom.
4) The current usage of VZP is within the expected scope.

d)

In the following section we take a look at the detection of reset interferences during transition into the autarchy state or other processes which could cause dynamic interferences in the RESET structure of a system (dampness, EMV, etc.).

When there is a new start of the system, directly after the RESET release and initialization of the autarchy, test markers are read out from nonvolatile memory 15 by microprocessor µC and evaluated. If it is set on "AUTARCHY ABLE TO BE CHECKED", the current measured value of energy reserve voltage VER is compared to system parameter VERoff_min.

If VER>VERoff, an undesired dynamic RESET has occurred in an otherwise operationally ready system. This error behavior is also counted in a warm reset error counter (WARMreset_FZ) of nonvolatile memory 15. If the error counter reaches the value q, e.g. q=3, a warning lamp is lit steadily or a CAN message (information concerning an error that has occurred) is output.

Furthermore, when there is no error of this type, error counter WARMreset_FZ is able to be decremented during start.

Figures 2, 2A:
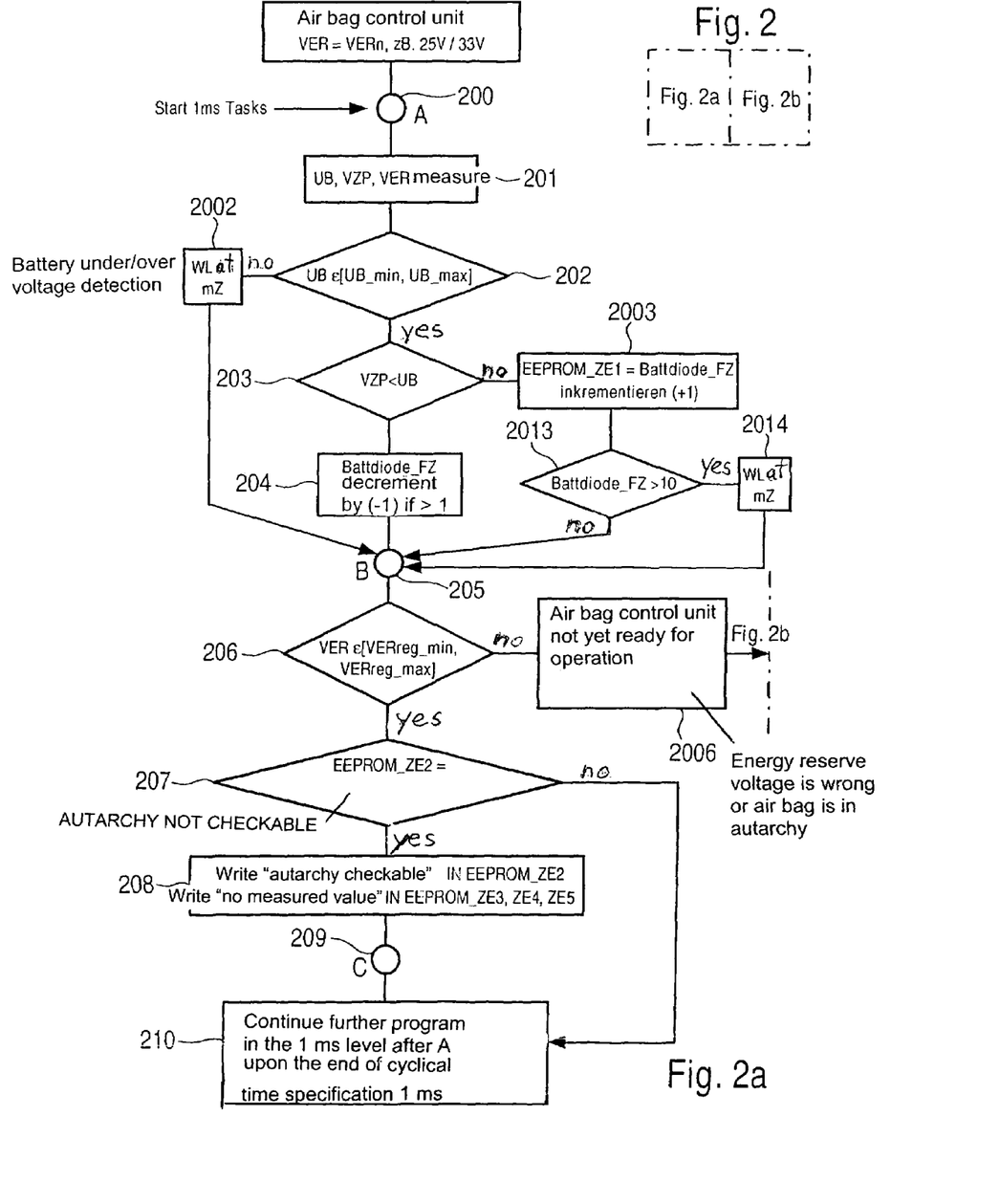
FIG. 2 shows an air bag flow chart ready for operation.
Figure 2B:
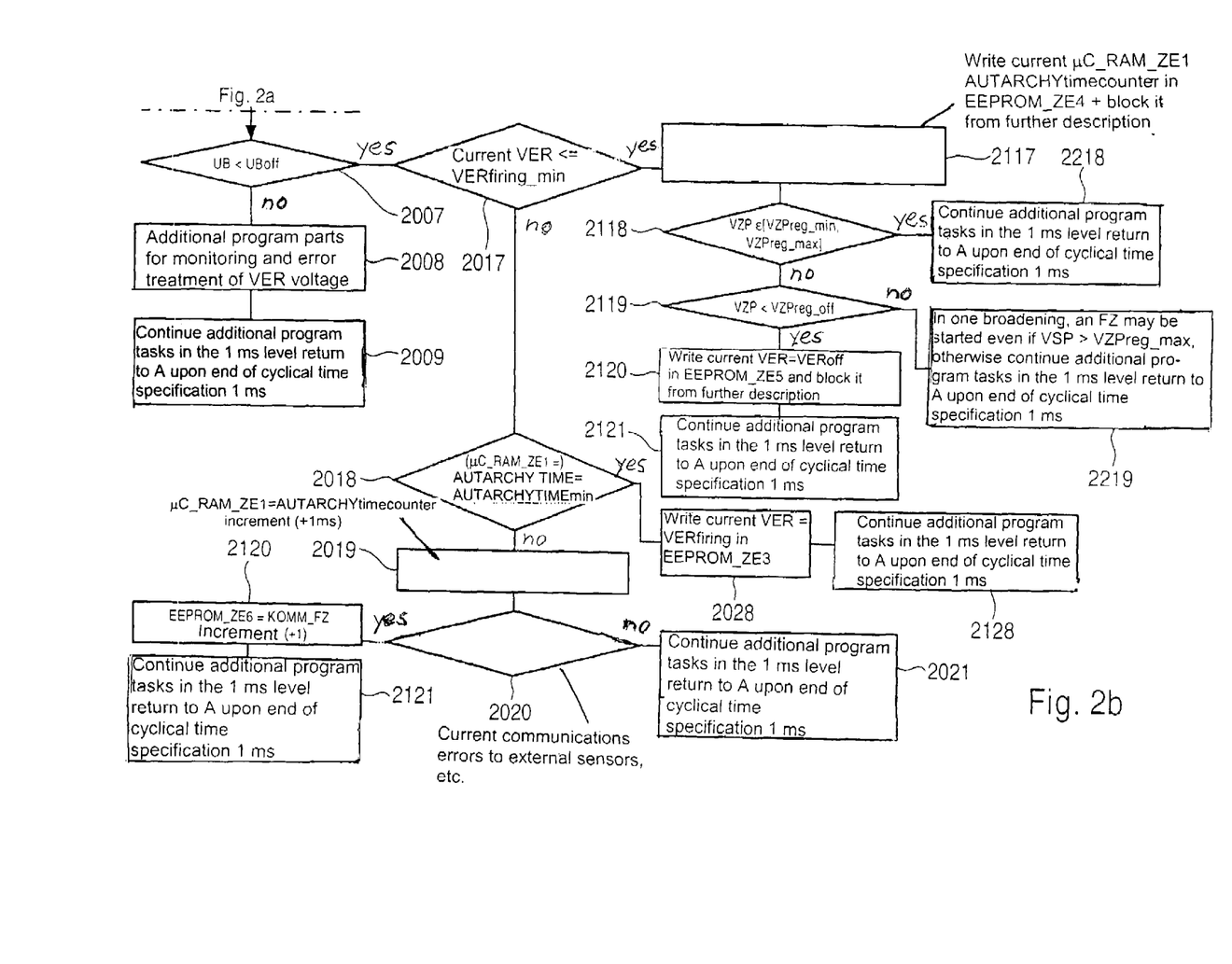

In a flow chart, FIG. 2 explains the sequence in principle in a control unit, starting from the operation-ready state.

At starting point A (200) the cyclical method sequence begins each ms. In method step 201 the current quantities UB, VZP, VER are measured. In method step 202 the battery voltage is tested for its maintaining a certain band. If there are inadmissible supply voltages present, in method step 2002 the warning lamp is lit (the information mZ, having time control, states that a lamp activation that is steady or of a different type timewise takes place, as desired) and the method is continued in B (205).

If the supply voltage is in the regular supply band (202 is true), the method is continued in step 203. If VZP<UB is true, battery polarity reversal protection diode 13 in FIG. 1 is present in the forward direction, and there follows method step 204, in which error counter (battdiode_FZ) is decremented because of freedom from error, if it is greater than 1.

The continuation of the method takes place in B (205). If the condition in method step 203 is not satisfied, there follows method step 2003. In it, allocated error counter battdiode_FZ is decremented. There follows method step 2013. If battdiode_FZ>10, that is, there is present a filtered, more certain error of polarity reversal protection diode 13 in FIG. 1, method step 2014 follows having the warning lamp lit and continuation of the method in B (205).

In method step 206 the energy reserve voltage is tested for its maintaining a certain band. If there are inadmissible energy reserve voltages, the reasons are named in 2006, and the method is continued in 2007.

If 206 is true, it is confirmed that the control unit is ready for operation. There follows method step 207, in which the content of memory cell autarchy test marker, e.g. cell 2 (15 in FIG. 1) is checked. If the content "AUTARCHY NOT ABLE TO BE CHECKED" is true, the method is continued in step 208. In writing processes, at this point, the given cells are preallocated having default cell contents. Thus, the method is ready to check a coming autarchy case for integrity, as a rule, a normal switching off of the system by turning the key switch to position o.

Method step 210 follows via starting point 209. If 207 is not true, the method is continued in C (209), since there has already been a preallocation of the memory cells. There then follows method step 210 which includes the further method steps in the 1 ms level which, however, have nothing to do with the invention being considered here. After their processing, there follows the renewed method sequence in A (200) exactly in the 1 ms (e.g. 1 ms-10 ms) cycle.

The continuation of the method in method step 2007, after the energy reserve voltage is not in the target band, checks the control unit supply voltage. If method step 2007 is true, that is, UB is too small or not present, there then follows method step 2017, in which it is checked whether the height of the energy reserve voltage is not sufficient for one firing via diode 17 and firing circuit FLIC (FLICS) in FIG. 1, or whether it is. If method step 2017 is true, method step 2117 follows. In this step, the current state of volatile µC_RAM autarchy time counter is written into nonvolatile EEPROM memory (15 in FIG. 1), for instance, in cell 4, if this has not already been done.

The next is method step 2118, in which it is checked whether the VZP regulation voltage lies in the valid band during autarchy. If method step 2118 is true, there follows method step 2218, which includes the further method steps in the 1 ms level which, however, have nothing to do with the invention being considered here. After their processing, there follows the renewed method sequence beginning at A (200) exactly in the 1 ms (e.g. 1 ms-10 ms) cycle.

If method step 2118 is false, there follows method step 2119, in which it is checked whether VZP is less than a lower boundary that characterizes the breakdown of the VZP regulation. If this step is true, there follows method step 2120, in which the current VER measured value, which is now equivalent to boundary VERoff, is written into a nonvolatile EEPROM memory (15, FIG. 1) by microprocessor µC, for instance, in cell 5, provided this has not already occurred.

There then follows method step 2121 which includes the further method steps in the 1 ms level which, however, have nothing to do with the invention being considered here. After their processing, there follows the renewed method sequence beginning at A (200) exactly in the 1 ms (e.g. 1 ms-10 ms) cycle.

If method step 2119 is false, that is, if the VZP voltage during the autarchy is too great, this also may be supplied to an error treatment in method step 2219.

There then follow the further method steps in the 1 ms level which, however, have nothing to do with the invention being considered here. After their processing, there follows the renewed method sequence beginning at A (200) exactly in the 1 ms (e.g. 1 ms-10 ms) cycle.

If method step 2017 is not true, that is, the energy reserve voltage has already fallen below the capability boundary for firing, there follows method step 2018.

In this step, the current autarchy time=counter reading of µC-RAM AUTARCHYtimecounter is checked against the lower boundary value AUTARCHYTIME_min known in the system. If the equality is exactly present, method step 2028 follows. With that, the energy reserve voltage is retained after the expiration of the required autarchy time, without evaluation.

There then follows method step 2128 which includes the further method steps in the 1 ms level which, however, have nothing to do with the invention being considered here. After their processing, there follows the renewed method sequence beginning at A (200) exactly in the 1 ms (e.g. 1 ms-10 ms) cycle.

If the condition in method step 2018 is not satisfied, that is, the autarchy time is unequal to AUTARCHYTIME_min, there follows method step 2019. In this step, the µC-RAM counter, for instance, in RAM cell 1, is incremented by 1 ms for the autarchy time. There follows method step 2020. In this step, there is a query regarding communications errors that have occurred to external sensors, etc. If an error has occurred, then in method step 2120 a communications error counter is incremented in a nonvolatile memory (15, FIG. 1), for instance, in cell 6.

There then follows method step 2121 which includes the further method steps in the 1 ms level which, however, have nothing to do with the invention being considered here. After their processing, there follows the renewed method sequence beginning at A (200) exactly in the 1 ms (e.g. 1 ms-10 ms) cycle.

If the condition in method step 2020 is not satisfied, that is, there are no communications errors present, there follows method step 2021 which includes the further method steps in the 1 ms level which, however, have nothing to do with the invention being considered here. After their processing, there follows the renewed method sequence beginning at A (200) exactly in the 1 ms (e.g. 1 ms-10 ms) cycle.

If method step 2007 is not fulfilled, switching off cannot be detected using UB, and 2008 follows. In this step, further program parts for monitoring the energy reserve voltage are executed, and, if necessary, their error treatment is carried out. There then follows method step 2009 which includes the further method steps in the 1 ms level which, however, have nothing to do with the invention being considered here. After their processing, there follows the renewed method sequence beginning at A (200) exactly in the 1 ms (e.g. 1 ms-10 ms) cycle.

Figures 3, 3A:
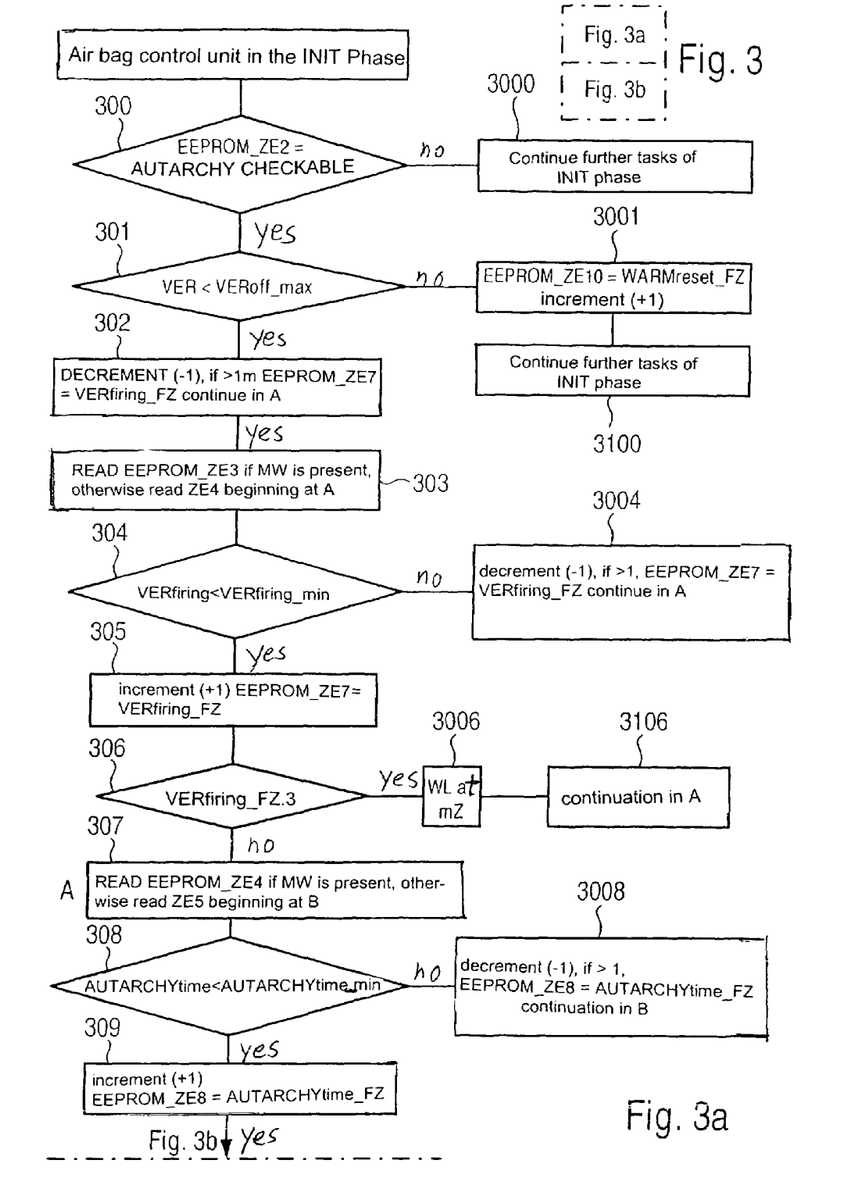
FIG. 3 shows an air bag flow chart in initialization.
Figure 3B:
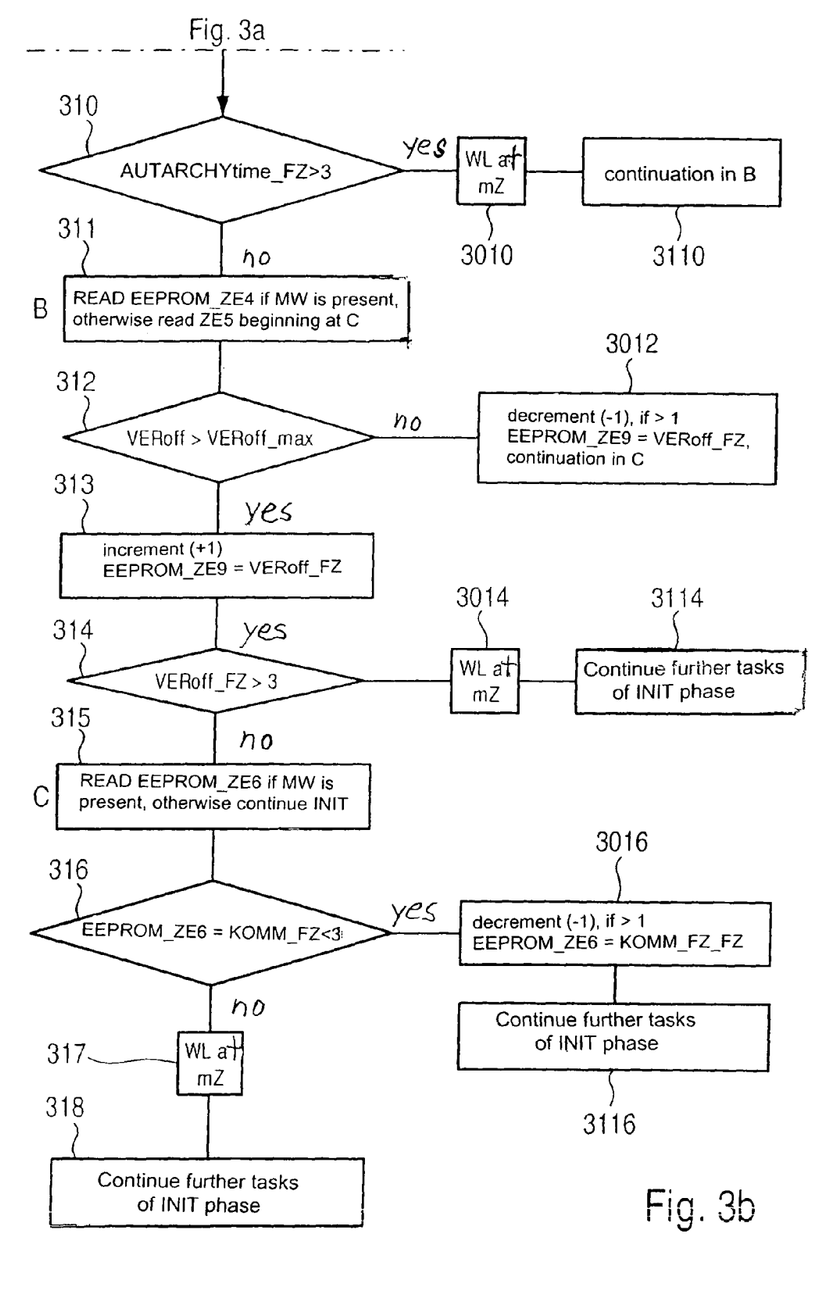

In a flow chart, FIG. 3 explains the sequence in principle in a control unit, starting from the initialization state.

In method step 300, the autarchy test marker in the EEPROM (15, FIG. 1) cell e.g. 2 is read by microprocessor µC. If the content "AUTARCHY ABLE TO BE CHECKED" is present, method step 301 is carried out. If this content is not present, then in method step 3000 further tasks in the initialization phase are carried out, which have nothing to do with the invention being considered here.

In method step 301 it is checked whether the current VER voltage is less than the value VERoff_max that is known to the system as a parameter for the "GOOD case". It is established hereby whether a regular autarchy has preceded. If the condition in method step 301 is satisfied, then there was no erroneous dynamic WARMreset present. The following step is method step 302. An error counter, which counts WARM-reset errors, is decremented in this instance in case it is greater than 1.

If the condition of method step 301 is not satisfied, a method step 3001 is next. In this case, the WARMreset error that has occurred is counted in a nonvolatile memory, e.g. in cell 10.

There then follows method step 3100, in which further tasks are carried out in the initialization phase which have nothing to do with the invention being considered here.

In method step 303 the contents of cells ZE3 (=VERfiring if AUTARCHYtime=AUTARCHYtime_min) and ZE4 (=AUTARCHYtime if VER=VERfiring_min) are read out by microprocessor µC from the nonvolatile memory.

In method step 304 there follows an evaluation of VERfiring. If VERfiring is less than VERfiring_min, known to the system as a parameter, method step 305 follows. In this instance, an already established error counter, such as EEPROM cell 7 is incremented for too low a VERfiring (=VERfiring_FZ).

In method step 306 there follows the checking of this error counter for a permitted filter boundary, such as 3. If this is exceeded, in method step 3006 there follows the activation of the warning lamp because of too low a VER voltage after required autarchy time.

There follows method step 3106, continuation in A. If method step 304 is not satisfied, that is, there is no erroneous voltage VERfiring after a minimum autarchy time, method step 3004 is next. In this instance, error counter VERfiring_FZ is decremented in the EEPROM, e.g. ZE7, to increase the robustness, and the method in A is continued.

In method step 307, the contents of cells ZE4 (=AUTARCHYtime for VER=VERfiring_min) are read out by microprocessor µC from the nonvolatile memory. In method step 308 there follows an evaluation of the possible autarchy time. If the autarchy time is less than AUTARCHYtime_min, known to the system as a parameter, that is, it is erroneous, method step 309 follows. In this instance, an already established error counter is incremented in EEPROM, e.g. cell 8, for too low an autarchy time (=AUTARCHYtime_FZ).

If method step 308 is not satisfied, that is, there is no autarchy error, in method step 3008 there follows a decrementing of the autarchy time errors that have accumulated so far, for increased robustness and a continuation of the method in B.

In method step 310 there follows the checking of this error counter for a permitted filter boundary, such as 3. If this is exceeded, in method step 3010 there follows the lighting of the warning lamp because of too low an autarchy time at a required minimum energy reserve voltage VERfiring_min. There follows method step 3110, continuation in B.

If method step 310 is not satisfied, that is, there is no filtered autarchy time error, there follows method step 311. In method step 311, the contents of cells ZE5 (=VERoff ER voltage at unstable VZP regulation) are read out by microprocessor µC from the nonvolatile memory.

In method step 312 there follows an evaluation of the VERoff voltage. If the autarchy time is less than AUTARCHYtime_min, known to the system as a parameter, that is, it is erroneous, method step 313 follows. In this step, an already established error counter is incremented for too high an energy reserve voltage when the instability of the VZP regulation occurs (=VERoff_FZ). In method step 314 there follows the checking of this error counter for a permitted filter boundary, such as 3. If this is exceeded, in method step 3014 there follows the lighting of the warning lamp because of too low a VERoff voltage at VZP instability. There follows method step 3114, continuation in C. If method step 312 is not satisfied, that is, the ER voltage is able to be utilized down to sufficiently low values without regulation difficulties in VZP, in method step 3012 there follows the decrementing of error counter VERoff_FZ if >1 and the continuation in C.

If method step 314 is not satisfied, that is, there is no filtered autarchy time error, method step 315 follows.

In method step 315, the contents of cells ZE6 (=KOMM_FZ, communications error counter to external sensors) are read out by microprocessor μC from the nonvolatile memory. In method step 316 there follows the checking of this error counter for a permitted filter boundary, such as 3. If this is exceeded, in method step 317 there follows the lighting of the warning lamp because of too low a VERoff voltage at VZP instability.

There then follows method step 318, in which further tasks are carried out in the initialization phase which have nothing to do with the invention being considered here.

In method step 316, if KOMM_FZ is below the filter boundary, method step 3016 follows, in which the error counter is decremented to increase robustness. There then follows method step 3116, in which further tasks are carried out in the initialization phase which have nothing to do with the invention being considered here.

Figure 4A:
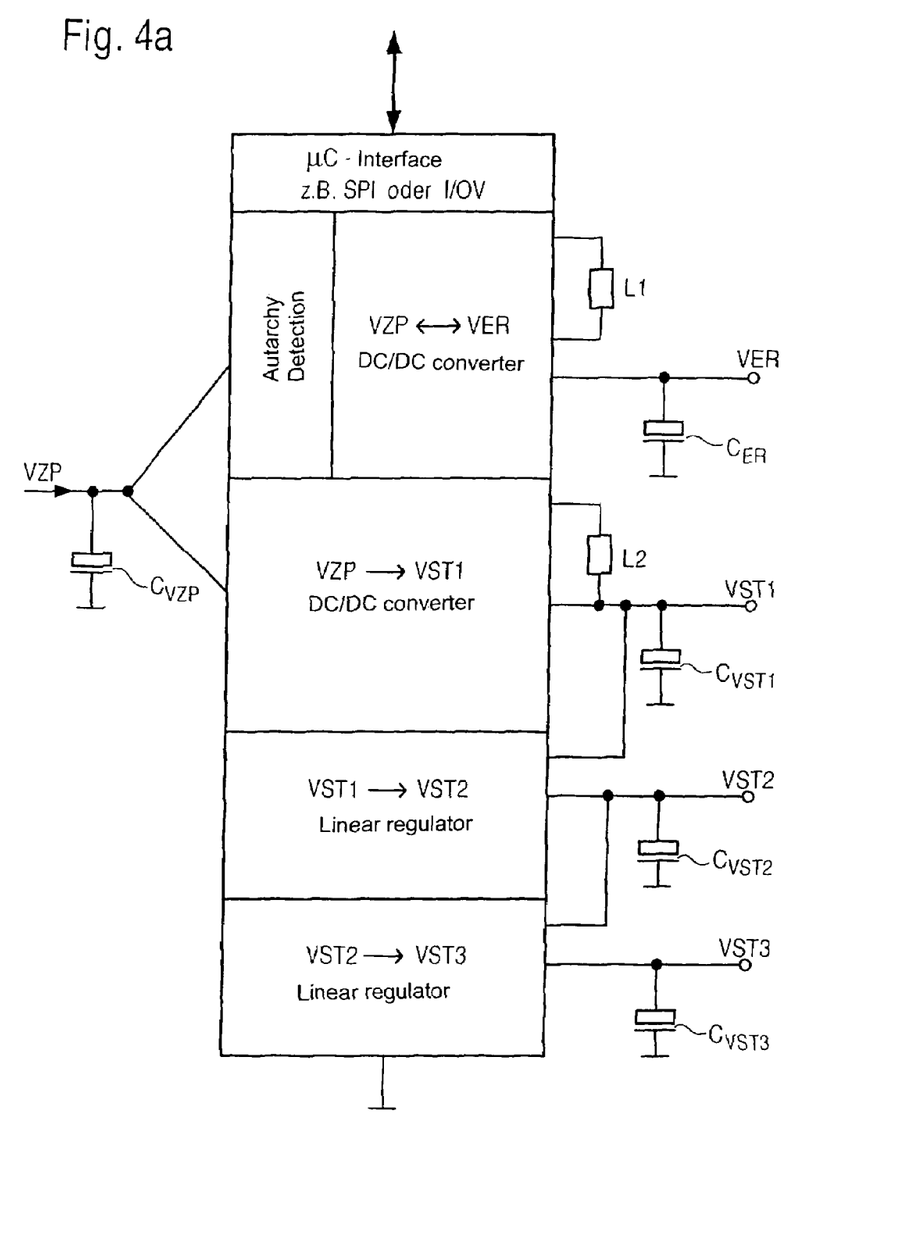
FIG. 4a shows a block diagram of the DC/DC converter.

FIG. 4a shows an execution of blocks 12a and 12b and 14 of FIG. 1, in an integrated module. For bidirectional DC/DC converter VZP←→VER, external coil L1 and a control capacitance Cer are required for the step-up operation VZP→VER, and a control capacitance Cvzp for the step-down operation VER→VZP in the autarchy case. To generate the analog/digital system voltages, VST1 is generated from VZP by a step-down transformer VZP→VST1. For this, coil L2 and control capacitance Cvst1 are required.

Figure 4B:
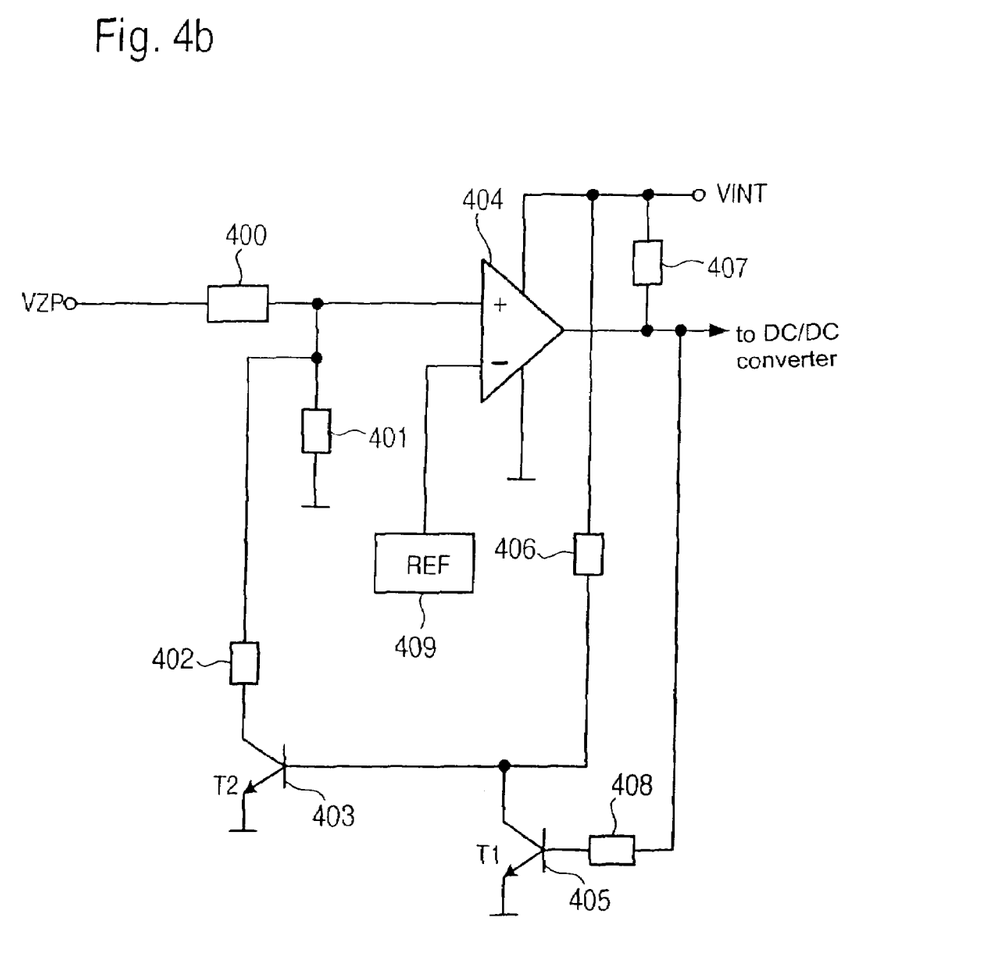
FIG. 4b shows a circuit diagram of an autarchy detection circuit.

VST2 (3.3 V) is generated from VST1 by a linear regulator. For this a regulating capacitance Cvst2 is required. VST3 (1.8 V) is generated from VST2 by a linear regulator. For this a regulating capacitance Cvst3 is required. The control of the step-down and step-up direction of bidirectional DC/DC converter VZP←→VER is performed by an autarchy detection circuit. In the simplest case, a circuit according to FIG. 4b is involved.

Voltage VZP is connected on one side to a resistor 400. The latter is connected to a resistor 402, resistor 401 and the positive input of a comparator 404. Resistor 401 is connected on the other side to ground. Resistor 402 is connected on the other side to the collector of an NPN transistor 403. The emitter of 403 is connected to ground. The base of transistor 403 is connected to the collector of transistor 405 and to one side of resistor 406. The emitter of transistor 405 is connected to ground. The base is connected to one side of resistor 408. The other side of resistor 408 is connected to the output of comparator 404. The other side of resistor 406 is connected to the IC-internal voltage VINT. The negative input of comparator 404 is connected to a reference voltage 40. The positive supply of comparator 404 is connected to VINT, and the negative supply of comparator 404 is connected to ground. The output of comparator 404 is additionally connected to resistor 407 on one side. The other side of resistor 407 is connected to VINT.

If voltage VZP is greater than a threshold voltage VZPth, for instance, 5.2 V, the voltage at the positive input of comparator 404 is greater than at the negative input, and resistor 407 puts the output of comparator 404 at approximately VINT=high output level. In the DC/DC converter this leads to a step-up operation VZP>VER.

If the voltage at VZP falls below VZPth, to 5 V, for instance, the voltage at the positive input of comparator 404 is less than at the negative input. The output of comparator 404 is connected to ground. Because of this, transistor 405 is also switched off via resistor 408, that is, it blocks.

Now the base of transistor 403 may be supplied with current via resistor 406. Transistor T2 conducts and switches resistor 403 parallel to resistor 401 of the input voltage divider.

This further drops the input voltage at the positive input of comparator 404, the center point of the input voltage divider. This means that the hysteresis formed stabilizes the new switching state of comparator 404. Its output voltage remains at ca. 0 V. The system is in the autarchy state. The low level at the output of comparator 404 signals to the DC/DC converter the step-down transformer operation VER→VZP.

What is claimed is:

1. A control unit for personal protection, comprising:
a control unit arrangement having a polarity reversal protection arrangement, between an external battery voltage and an internal voltage, to prevent an energy discharge; and
a bidirectional DC/DC converter, between an energy reserve and the internal voltage, to determine its direction of conversion as a function of the internal voltage; wherein:
the control unit arrangement is configured so that, after a switching-off process, the control unit arrangement records at least one measured value and generates a signal as a function of the at least one measured value which characterizes an autarchy behavior of the control unit arrangement; and
the at least one measured value includes an energy reserve voltage, the control unit arrangement being configured so that, after the switching-off process, the control unit arrangement measures the energy reserve voltage for a specified time to pick up the energy reserve voltage.

2. The control unit of claim 1, wherein the control unit arrangement activates an output as a function of at least one of the at least one measured value and the signal.

3. The control unit of claim 1, wherein the control unit arrangement undertakes a storage as a function of at least one of the at least one measured value and the signal.

4. The control device of claim 1, wherein the control unit arrangement changes at least one counter as a function of at least one of the at least one measured value and the signal.

5. A control unit for personal protection, comprising:
a control unit arrangement having a polarity reversal protection arrangement, between an external battery voltage and an internal voltage, to prevent an energy discharge; and
a bidirectional DC/DC converter, between an energy reserve and the internal voltage, to determine its direction of conversion as a function of the internal voltage; wherein:
the control unit arrangement is configured so that, after a switching-off process, the control unit arrangement records at least one measured value and generates a signal as a function of the at least one measured value which characterizes an autarchy behavior of the control unit arrangement; and
the at least one measured value includes an error counter for the communication of the control unit arrangement with at least one sensor that is connected to the control unit arrangement.

6. The control unit of claim 5, wherein the control unit arrangement activates an output as a function of at least one of the at least one measured value and the signal.

7. The control unit of claim 5, wherein the control unit arrangement undertakes a storage as a function of at least one of the at least one measured value and the signal.

8. The control device of claim 5, wherein the control unit arrangement changes at least one counter as a function of at least one of the at least one measured value and the signal.

9. A control unit for personal protection, comprising:
- a control unit arrangement having a polarity reversal protection arrangement, between an external battery voltage and an internal voltage, to prevent an energy discharge; and
- a bidirectional DC/DC converter, between an energy reserve and the internal voltage, to determine its direction of conversion as a function of the internal voltage;

wherein:
- the control unit arrangement is configured so that, after a switching-off process, the control unit arrangement records at least one measured value and generates a signal as a function of the at least one measured value which characterizes an autarchy behavior of the control unit arrangement; and
- the at least one measured value includes an autarchy time which the control unit arrangement determines so that it measures a time after the switching-off process up to which the energy supply voltage has fallen to a specified value which still makes possible a triggering of a personal protection arrangement.

10. The control unit of claim 9, wherein the control unit arrangement activates an output as a function of at least one of the at least one measured value and the signal.

11. The control unit of claim 9, wherein the control unit arrangement undertakes a storage as a function of at least one of the at least one measured value and the signal.

12. The control device of claim 9, wherein the control unit arrangement changes at least one counter as a function of at least one of the at least one measured value and the signal.

13. A control unit for personal protection, comprising:
- a control unit arrangement having a polarity reversal protection arrangement, between an external battery voltage and an internal voltage, to prevent an energy discharge; and
- a bidirectional DC/DC converter, between an energy reserve and the internal voltage, to determine its direction of conversion as a function of the internal voltage;

wherein:
- the control unit arrangement is configured so that, after a switching-off process, the control unit arrangement records at least one measured value and generates a signal as a function of the at least one measured value which characterizes an autarchy behavior of the control unit arrangement;
- the at least one measured value includes the energy reserve voltage;
- the control unit arrangement measures the energy reserve voltage after a switching-on process, the switching-on process occurring after the switching-off process; and
- for generating the signal, the control unit takes into consideration a memory input that was undertaken before the switching-off process.

14. The control unit of claim 13, wherein the control unit arrangement activates an output as a function of at least one of the at least one measured value and the signal.

15. The control unit of claim 13, wherein the control unit arrangement undertakes a storage as a function of at least one of the at least one measured value and the signal.

16. The control device of claim 13, wherein the control unit arrangement changes at least one counter as a function of at least one of the at least one measured value and the signal.

* * * * *